US010229355B2

(12) United States Patent
Ronagh et al.

(10) Patent No.: US 10,229,355 B2
(45) Date of Patent: Mar. 12, 2019

(54) QUANTUM PROCESSOR AND ITS USE FOR IMPLEMENTING A NEURAL NETWORK (71) Applicant: 1QB INFORMATION TECHNOLOGIES INC., Vancouver, British Columbia (CA)

(72) Inventors: Pooya Ronagh, Vancouver (CA); Anna Levit, Coquitlam (CA); Daniel Crawford, Vancouver (CA)

(73) Assignee: IQB INFORMATION TECHNOLOGIES INC., Vancouver (CA)

( * ) Notice: Subject to any disclaimer, the term of this patent is extended or adjusted under 35 U.S.C. 154(b) by 0 days.

(21) Appl. No.: 15/097,823

(22) Filed: Apr. 13, 2016

(65) Prior Publication Data
US 2017/0300808 A1    Oct. 19, 2017

(51) Int. Cl.
| G06Q 30/02 | (2012.01) |
| G06N 3/06  | (2006.01) |
| G06N 99/00 | (2019.01) |
| G06N 3/04  | (2006.01) |
| G06N 3/08  | (2006.01) |

(52) U.S. Cl.
CPC .......... *G06N 3/06* (2013.01); *G06N 3/04* (2013.01); *G06N 3/08* (2013.01); *G06N 99/002* (2013.01)

(58) Field of Classification Search
CPC .... G02B 27/2278; G03B 35/08; G03B 35/18; G06N 5/003; G06N 3/06
See application file for complete search history.

(56) References Cited

U.S. PATENT DOCUMENTS

| 8,421,053 B2 | 4/2013 | Bunyk et al. |
| 2006/0225165 A1 | 10/2006 | Maassen Van Den Brink et al. |
| | | (Continued) |

FOREIGN PATENT DOCUMENTS

| WO | WO 2005/122052 | 12/2005 |
| WO | WO 2014/210368 | 12/2014 |
| | (Continued) | |

OTHER PUBLICATIONS

'Application of Quantum Annealing to Training of Deep Neural Networks': Adachi, 2015, Lockheed Martin.*
(Continued)

*Primary Examiner* — Robert A Cassity
(74) *Attorney, Agent, or Firm* — Pearl Cohen Zedek Latzer Baratz LLP (57) ABSTRACT

A quantum processor comprises a first set of qubits comprising a first plurality of substantially parallel qubits; a second set of qubits comprising N successive groups of a plurality of qubits (1, 2, . . . , N), wherein N is greater than or equal to two; wherein each group of qubits comprises a plurality of substantially parallel qubits; wherein each qubit of the first plurality of substantially parallel qubits of the first set of qubits crosses substantially perpendicularly a portion of the plurality of substantially parallel qubits of a first group of the second set of qubits; wherein each qubit of any given group of the second set of qubits crosses substantially perpendicularly a portion of the plurality of substantially parallel qubits of a successive group of the second set of qubits and a plurality of couplers, each coupler for providing a communicative coupling at a crossing of two qubits.

15 Claims, 5 Drawing Sheets

(56) References Cited

U.S. PATENT DOCUMENTS

| | | | |
|---|---|---|---|
| 2013/0005580 A1 | 1/2013 | Bunyk et al. | |
| 2015/0046457 A1* | 2/2015 | Weinstein | G06K 9/622 |
| | | | 707/737 |
| 2015/0046681 A1 | 2/2015 | King | |
| 2015/0095477 A1* | 4/2015 | Jung | H04M 1/72519 |
| | | | 709/223 |
| 2016/0335558 A1 | 11/2016 | Bunyk et al. | |

FOREIGN PATENT DOCUMENTS

| | | |
|---|---|---|
| WO | WO 2015/143439 A1 | 9/2015 |
| WO | WO 2016/089711 | 6/2016 |
| WO | WO 2016/089711 A1 | 6/2016 |

OTHER PUBLICATIONS

'Quantum Boltzmann Machine': Amin, Jan. 2016, Cornell Univ.*
'Reinforcement Learning Using Quantum Boltzmann Machines': Crawford, Dec. 2016, Cornell Univ.*
'Elements of Artificial Neural Networks': Mehrotra, 1997, MIT Press.*
Ackley et al., "A Learning Algorithm for Boltzmann Machines," Cognitive Science, vol. 9, p. 147-169 (1985).
Amin et al., "Quantum Boltzmann Machine," arXiv:1601.02036v1 [quant-ph], Jan. 8, 2016.
Barone et al., 1982, Physics and Applications of the Josephson Effect, John Wiley and Sons, New York; Martinis et al., 2002, Physical Review Letters 89, 117901.
Bengio et al, "Representation Learning: A Review and New Perspectives," arXiv:1206.5538v3 [cs.LG] (Section 6) Apr. 23, 2014, pp. 1-30. http://www.cl.uni-heidelberg.de/courses/ws14/deepl/BengioETAL12.pdf.
Bian et al. "The Ising model: teaching an old problem new tricks." D-Wave Systems. Aug. 30, 2010, pp. 1-32.
Farhi et al., "Quantum Adiabatic Evolution Algorithms versus Simulated Annealing", arXiv.org:quant-ph/0201031v1, Jan. 8, 2002, pp. 1-16.
McGeoch et al., "Experimental Evaluation of an Adiabatic Quantum System for Combinatorial Optimization," Computing Frontiers, May 14-16, 2013, http://www.cs.amherst.edu/ccm/cf14-mcgeoch.pdf.
Nielsen, Michael A. "Neural Networks and Deep Learning," Chapter 6, Determination Press, 2015, http://neuralnetworksanddeeplearning.com/chap6.html.
Wiebe et al. "Quantum Deep Learning", arXiv: 1412.3489v2[quant-ph], pp. 1-34, https://arxiv.org/abs/1412.3489v2 Accessed Mar. 11, 2016), May 22, 2015 (May 22, 2015).
Office Action for Canadian Patent Application No. 2,927,171, dated Nov. 4, 2016.
International Search Report of PCT Application No. PCT/IB2017/052149, dated Jul. 20, 2017.

* cited by examiner

QUANTUM PROCESSOR AND ITS USE FOR IMPLEMENTING A NEURAL NETWORK

FIELD OF THE INVENTION

The invention relates to computing. More precisely, this invention pertains to a quantum processor and its use for implementing a neural network.

BACKGROUND OF THE INVENTION

Artificial Neural Networks

Artificial Neural Networks (ANN) are computational models inspired by biological neural networks and are used for approximation of functions. Artificial Neural Networks have graph theoretical representations where the nodes of the graph are also called the neurons and the edges of it are also known as synapses.

General Boltzmann Machines (GBM) are a type of Artificial Neural Networks where the neurons represent binary variables with a linear bias attached to them and every synapse between two neurons represents a quadratic term involving the binary variables associated to the neurons. In particular, there is a global energy function associated to the General Boltzmann Machine consisting of contributions from all the linear and quadratic terms.

General Boltzmann Machines are therefore graphical models used for approximating the joint distribution of dependent variables. The corresponding graph contains nodes referred to as visible nodes (or input variables), and non-visible nodes called hidden nodes (or latent variables). General Boltzmann Machines were developed to represent and solve certain combinatorial problems, and can be used as a probabilistic machine learning tool. The applications of General Boltzmann machine include but are not limited to visual object and speech recognition, classification, regression tasks, dimensionality reduction, information retrieval, and image reconstruction. For an overview of General Boltzmann Machines, see D. Ackley, G. Hinton, T. Sejnowski, "*A Learning Algorithm for Boltzmann Machines*," Cognitive Science 9, 147-169 (1985).

The distribution approximation in General Boltzmann Machines is performed by encoding the dependent variables of interest as nodes of a larger graph. These nodes are the visible nodes and all the other nodes are the hidden nodes. There is a weight and a bias assigned to respectively every edge and vertex in the graph, and an energy function is assigned to the graph that depends on these weights and biases.

General Boltzmann Machines with arbitrary connections have not proven to be especially useful in a machine learning sense. This is due to the approximate learning method being slow, and especially in the cases where there are hidden units far from the visible units. When certain restrictions are made on the connection between hidden nodes, the General Boltzmann Machine neural network becomes more easily trained and useful for machine learning tasks. When no connections are allowed between hidden nodes and no connections are allowed between visible nodes, the resulting neural network is called a Restricted Boltzmann Machine (RBM), consisting only of one visible layer and one hidden layer.

With no intra-visible or intra-hidden node connections, efficient training algorithms have been developed that make Restricted Boltzmann Machines good performers in areas of machine learning through ease in learning probability distributions over a set of inputs on the visible layer. For applications, algorithms, and theory, see section 6 of Y. Bengio et al, "*Representation Learning: A Review and New Perspectives, arXiv* 2014—(http://www.cl.uni-heidelberg.de/courses/ws14/deepl/BengioETAL12.pdf)

The idea of the Restricted Boltzmann Machine has been pluralized in order to create more effective neural networks called Deep Boltzmann Machines (DBM). Deep Boltzmann Machines are created by stacking Restricted Boltzmann Machines on top of each other such that the hidden layer of the first Restricted Boltzmann Machine is used as the visible layer to the second Restricted Boltzmann Machine, the hidden layer of the second acts as the visible layer to the third Restricted Boltzmann Machine, and so on. This structure is studied extensively and is the basis of deep learning. The advantage of this structure is that the network weights and biases can be trained Restricted Boltzmann Machine by Restricted Boltzmann Machine, from the top down, using the same training algorithms developed for stand-alone Restricted Boltzmann Machines. For applications, algorithms, and theory behind Deep Boltzmann Machines, see: http://neuralnetworksanddeeplearning.com/chap6.html The Restricted Boltzmann Machine by Restricted Boltzmann Machine approach to training a Deep Boltzmann Machine comes at the cost of accumulating errors which arise from approximations of distribution for each Restricted Boltzmann Machine.

Quantum Processors

A quantum processor is a quantum mechanical system of a plurality of qubits, measurements over which will result samples from the Boltzmann distribution defined by the global energy of the system.

Qubits are physical implementation of a quantum mechanical system represented on a Hilbert space and realizing at least two distinct and distinguishable eigenstates that represent two states of a quantum bit. A quantum bit is the analogue of the digital bit, where the ambient storing device may store two states $|0\rangle$ and $|1\rangle$ of a two-state quantum information, but also in superpositions $\alpha|0\rangle + \beta|1\rangle$ of the two states. In various embodiments, such systems may have more than two eigenstates in which case the additional eigenstates are used to represent the two logical states by degenerate measurements. Various embodiments of implementations of qubits have been proposed: e.g., solid-state nuclear spins, measured and controlled electronically or with nuclear magnetic resonance, trapped ions, atoms in optical cavities (cavity quantum-electrodynamics), liquid state nuclear spins, electronic charge or spin degrees of freedom in quantum dots, superconducting quantum circuits based on Josephson junctions [Barone and Paterno, 1982, *Physics and Applications of the Josephson Effect*, John Wiley and Sons, New York; Martinis et al., 2002, *Physical Review Letters* 89, 117901] and electrons on Helium.

To each qubit is inductively coupled a source of bias called a local field bias. In one embodiment a bias source is an electromagnetic device used to thread a magnetic flux through the qubit to provide control of the state of the qubit [US 2006/0225165].

The local field biases on the qubits are programmable and controllable. In one embodiment, a qubit control system comprising a digital processing unit is connected to the system of qubits and is capable of programming and tuning the local field biases on the qubits.

A quantum processor may furthermore comprise of a plurality of couplings between a plurality of pairs of the plurality of qubits. A coupling between two qubits is a device in proximity of both qubits threading a magnetic flux to both qubits. In one embodiment, a coupling may consist of a superconducting circuit interrupted by a compound Josephson junction. A magnetic flux may thread the compound Josephson junction and consequently thread a magnetic flux on both qubits [US 2006/0225165]. The strength of this magnetic flux contributes quadratically to the energies of the quantum processor. In one embodiment, the coupling strength is enforced by tuning the coupling device in proximity of both qubits.

The coupling strengths are controllable and programmable. In one embodiment, a quantum device control system comprising of a digital processing unit is connected to the plurality of couplings and is capable of programming the coupling strengths of the quantum processor.

A quantum annealer is a quantum processor that carries quantum annealing as described, for example, in Farhi, E. et al., "Quantum Adiabatic Evolution Algorithms versus Simulated Annealing" arXiv.org: quant ph/0201031 (2002), pp. 1 16.

Quantum annealers perform a transformation of the quantum processor from an initial setup to a final one. The initial and final setups of the quantum processor provide quantum systems described by their corresponding initial and final Hamiltonians. For a quantum annealer with local field biases and couplings as described above a final Hamiltonian can be expressed as a quadratic function $f(x)=\Sigma_i h_i x_i + \Sigma_{(i,j)} J_{(i,j)} x_i x_j$ where the first summation runs over an index i representing the qubits of the quantum annealer and the second summation is over pairs (i,j) for which there is a coupling between qubits i and j.

Quantum annealers can be used as heuristic optimizers of their energy function. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14 16, 2013 (http://www.cs.amherst.edu/ccm/cf14-mcgeoch.pdf) and also disclosed in the Patent Application US 2006/0225165.

With minor modifications to the quantum annealing process, quantum processors can instead be used to provide samples form the Boltzmann distribution of their energy function in a finite temperature. The reader is referred to the technical report: Bian, Z., Chudak, F., Macready, W. G. and Rose, G. (2010), "The Ising model: teaching an old problem new tricks", and also Amin, M. H., Andriyash, E., Rolfe, J., Kulchytskyy, B., and Melko, R. (2016), "Quantum Boltzmann Machine" arXiv:1601.02036.

This method of sampling is called quantum sampling.

For a quantum processor with local field biases and couplings, quantum sampling provides samples from a distribution that is slightly different from the Boltzmann distribution of the quadratic function $f(x)$ introduced above.

The reference Amin, M. H., Andriyash, E., Rolfe, J., Kulchytskyy, B., and Melko, R. (2016), "Quantum Boltzmann Machine" arXiv:1601.02036 studies how far quantum sampling is from Boltzmann sampling.

Features of the invention will be apparent from review of the disclosure, drawings, and description of the invention below.

BRIEF SUMMARY OF THE INVENTION

According to a broad aspect, there is disclosed a quantum processor comprising a first set of qubits comprising a first plurality of substantially parallel qubits; a second set of qubits comprising N successive groups of a plurality of qubits (1, 2, . . . , N), wherein N is greater than or equal to two; wherein each group of qubits comprises a plurality of substantially parallel qubits; wherein each qubit of the first plurality of substantially parallel qubits of the first set of qubits crosses substantially perpendicularly a portion of the plurality of substantially parallel qubits of a first group of the second set of qubits; wherein each qubit of any given group of the second set of qubits crosses substantially perpendicularly a portion of the plurality of substantially parallel qubits of a successive group of the second set of qubits and a plurality of couplers, each coupler for providing a communicative coupling at a crossing of two qubits.

According to an embodiment, the quantum processor is used for implementing a neural network comprising a plurality of neurons and a plurality of synapses; wherein each neuron of the plurality of neurons is associated to a qubit and each synapse of the plurality of synapses is associated to a coupler of the quantum processor.

In accordance with an embodiment, there is disclosed a method for training the neural network implemented in the quantum processor, the method comprising providing initialization data for initializing the plurality of couplers and the plurality of qubits of the quantum processor; until a criterion is met: performing a quantum sampling of the quantum processor to provide first empirical means, obtaining at least one training data instance for training the neural network, performing a quantum sampling of the quantum processor; wherein no bias is assigned to the qubits of the first set of qubits of the quantum processor; wherein the couplings of the first set of qubits and the first group of the second set of qubits are switched off; further wherein the biases of the first group of the second set of qubits are altered using the biases on a first group of neurons associated with the first group of qubits, the weights of the switched off couplings, and the at least one training data instance, to determine second empirical means, and updating corresponding weights and biases of the couplers and the qubits of the quantum processor using the first and second empirical means and providing final weights and biases of the couplers and the qubits of the quantum processor indicative of data representative a trained neural network.

In accordance with an embodiment, the initialization data comprise a plurality of biases, each for a qubit of the plurality of qubits; a plurality of weights, each weight for a coupler of the plurality of couplers and a learning rate schedule.

In accordance with an embodiment, the providing of the initialization data is performed using an analog computer comprising the quantum processor and a digital computer operatively connected to the analog computer.

In accordance with an embodiment, the at least one training data instance is obtained from a previously generated data set.

In accordance with an embodiment, the at least one training data instance is obtained from a real-time source.

In accordance with an embodiment, the generated data set is stored in a digital computer operatively connected to an analog computer comprising the quantum processor.

In accordance with an embodiment, the real-time source originates from a digital computer operatively connected to an analog computer comprising the quantum processor.

In accordance with an embodiment, the criterion comprises a stopping condition and the stopping condition comprises determining if there is no further training data instance available.

In accordance with an embodiment, the digital computer comprises a memory and the providing of the final weights and biases of the couplers and the qubits of the quantum processor comprises storing the final weights and biases of the couplers and the qubits of the quantum processor in the memory of the digital computer.

In accordance with an embodiment, the providing of the final weights and biases of the couplers and the qubits of the quantum processor comprises providing the final weights and biases of the couplers and the qubits of the quantum processor to another processing unit operatively connected to the digital computer.

In accordance with a broad aspect, there is disclosed a digital computer comprising a central processing unit; a display device; a communication port for operatively connecting the digital computer to an analog computer comprising a quantum processor used for implementing the neural network and a memory unit comprising an application for training the neural network, the application comprising instructions for providing initialization data for initializing the plurality of couplers and the plurality of biases of the qubits of the quantum processor; instructions for, until a criterion is met performing a quantum sampling of the quantum processor to provide first empirical means, obtaining at least one training data instance for training the neural network, performing a quantum sampling of the quantum processor; wherein no bias is assigned to the qubits of the first set of qubits of the quantum processor; wherein the couplings of the first set of qubits and the first group of the second set of qubits are switched off; further wherein the biases of the first group of the second set of qubits are altered using the biases on a first group of neurons associated with the first group of qubits, the weights of the switched off couplings, and the at least one training data instance, to determine second empirical means and updating corresponding weights and biases of the couplers and the qubits of the quantum processor using the first and the second empirical means; and instructions for providing final weights and biases of the couplers and the qubits of the quantum processor as data representative of a trained neural network.

According to a broad aspect, there is disclosed a non-transitory computer readable storage medium for storing computer-executable instructions which, when executed, cause a digital computer to perform a method for training the neural network implemented in the quantum processor, the method comprising providing initialization data for initializing the plurality of couplers and the plurality of qubits of the quantum processor; until a criterion is met performing a quantum sampling of the quantum processor to provide first empirical means, obtaining at least one training data instance for training the neural network, performing a quantum sampling of the quantum processor; wherein no bias is assigned to the qubits of the first set of qubits of the quantum processor; wherein the couplings of the first set of qubits and the first group of the second set of qubits are switched off; further wherein the biases of the first group of the second set of qubits are altered using the biases on a first group of neurons associated with the first group of qubits, the weights of the switched off couplings, and the at least one training data instance, to determine second empirical means, and updating corresponding weights and biases of the couplers and the qubits of the quantum processor using the first and second empirical means and providing final weights and biases of the couplers and the qubits of the quantum processor indicative of data representative a trained neural network.

In accordance with an embodiment, the neural network is a Deep Boltzmann Machine.

An advantage of the quantum processor disclosed herein is that it is comprised only of a system of quantum circuits with degree two interactions.

Another advantage of the quantum processor disclosed herein is that it can be used to implement a Deep Boltzmann Machine.

Another advantage of the method disclosed herein for training the Deep Boltzmann Machine implemented in the quantum processor is that it is faster than prior-art methods.

Another advantage of the method disclosed herein for training the Deep Boltzmann Machine implemented in the quantum processor is that it is more accurate compared to the prior-art Restricted Boltzmann Machine by Restricted Boltzmann Machine training method.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an," "the" and "at least one" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "analog computer" means a system comprising a quantum processor, control systems of qubits, coupling devices, and a readout system, all connected to each other through a communication bus.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways. In this specification, these implementations, or any other form that the invention may take, may be referred to as systems or techniques. A component such as a processor or a memory described as being configured to perform a task includes either a general component that is temporarily configured to perform the task at a given time or a specific component that is manufactured to perform the task.

With all this in mind, the present invention is directed to a quantum processor and its use for implementing a neural network.

Figure 1:
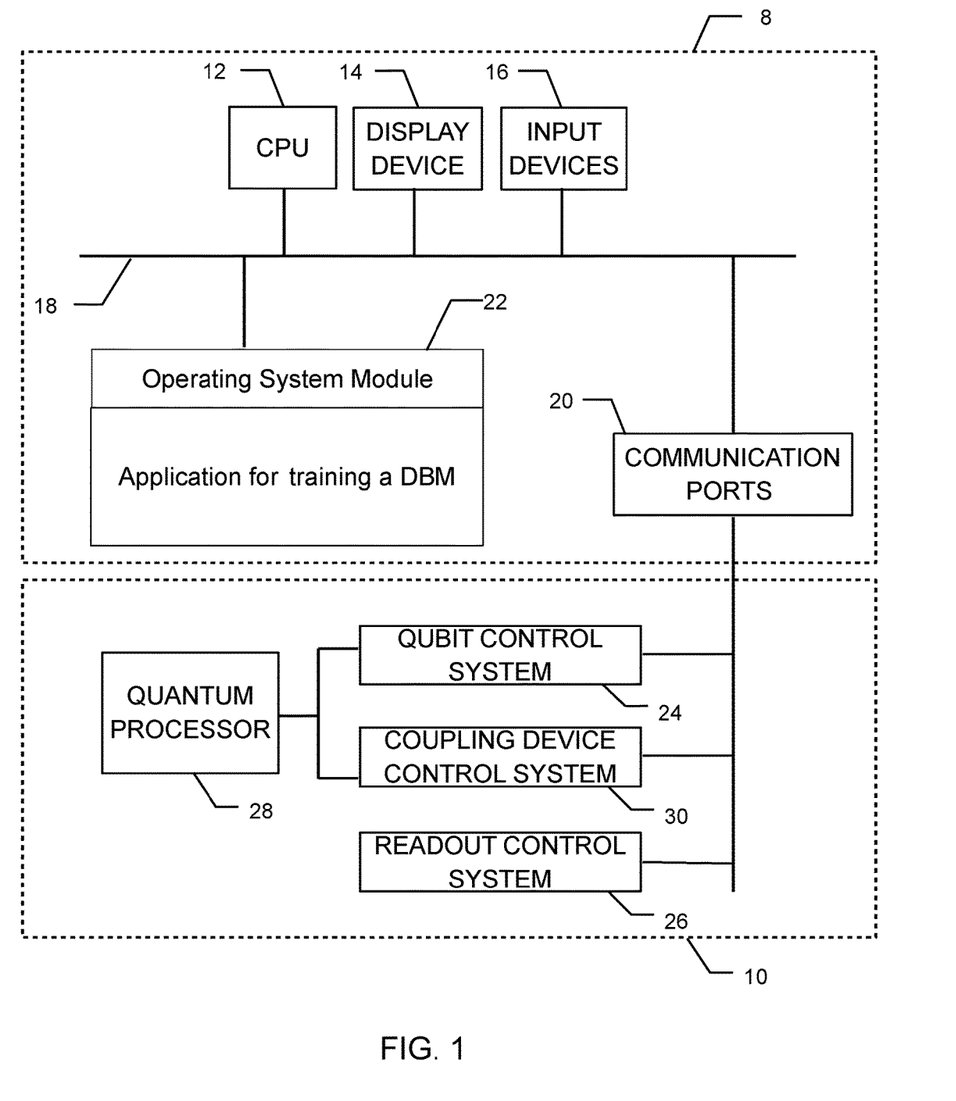
FIG. 1 is a diagram that shows an embodiment of a system comprising a digital system coupled to an analog computer.

Now referring to FIG. 1, there is shown a diagram that shows an embodiment of a system comprising a digital system 8 coupled to an analog computer 10.

It will be appreciated that the digital computer 8 may be any type of digital computer.

In one embodiment, the digital computer 8 is selected from a group consisting of desktop computers, laptop computers, tablet PC's, servers, smartphones, etc. It will also be appreciated that, in the foregoing, the digital computer 8 may also be broadly referred to as a processor.

In the embodiment shown in FIG. 1, the digital computer 8 comprises a central processing unit 12, also referred to as a microprocessor, a display device 14, input devices 16, communication ports 20, a data bus 18 and a memory 22.

The central processing unit 12 is used for processing computer instructions. The skilled addressee will appreciate that various embodiments of the central processing unit 12 may be provided.

In one embodiment, the central processing unit 12 comprises a CPU Core i5 3210 running at 2.5 GHz and manufactured by Intel.

The display device 14 is used for displaying data to a user. The skilled addressee will appreciate that various types of display device 14 may be used.

In one embodiment, the display device 14 is a standard liquid crystal display (LCD) monitor.

The input devices 16 are used for inputting data into the digital computer 8.

The communication ports 20 are used for sharing data with the digital computer 8.

The communication ports 20 may comprise, for instance, universal serial bus (USB) ports for connecting a keyboard and a mouse to the digital computer 8.

The communication ports 20 may further comprise a data network communication port such as IEEE 802.3 port for enabling a connection of the digital computer 8 with an analog computer 10.

The skilled addressee will appreciate that various alternative embodiments of the communication ports 20 may be provided.

The memory unit 22 is used for storing computer-executable instructions.

The memory unit 22 may comprise a system memory such as a high-speed random access memory (RAM) for storing system control program (e.g., BIOS, operating system module, applications, etc.) and a read-only memory (ROM).

It will be appreciated that the memory unit 22 comprises, in one embodiment, an operating system module.

It will be appreciated that the operating system module may be of various types.

In one embodiment, the operating system module is OS X Yosemite manufactured by Apple™.

The memory unit 22 further comprises an application for training a neural network implemented in the quantum processor 28 of the analog computer 10.

The memory unit 22 may further comprise an application for using the analog computer 10.

The memory unit 22 may further comprise quantum processor data such as a corresponding weight for each coupler of the quantum processor 28 and a corresponding bias for each qubit of the quantum processor 28.

The analog computer 10 comprises a qubit control system 24, a readout control system 26, a quantum processor 28, and a coupling device control system 30.

The quantum processor 28 may be of various types. In one embodiment, the quantum processor comprises superconducting qubits.

The readout control system 26 is used for reading the qubits of the quantum processor 28. In fact, it will be appreciated that in order for a quantum processor to be used in the method disclosed herein, a readout system that measures the qubits of the quantum system in their quantum mechanical states is required. Multiple measurements provide a sample of the states of the qubits. It is furthermore required that this sample is from a Boltzmann distribution defined by the energy function of the system. The results from the readings are fed to the digital computer 8. The biases of the qubits of the quantum processor 28 are controlled via the qubit control system 24. The couplers are controlled via the coupling device control system 30.

It will be appreciated that the readout control system 26 may be of various types. For instance, the readout control system 26 may comprise a plurality of dc-SQUID magnetometers, each inductively connected to a different qubit of the quantum processor 28. The readout control system 26 may provide voltage or current values. In one embodiment, the dc-SQUID magnetometer comprises a loop of superconducting material interrupted by at least one Josephson junction, as is well known in the art.

The coupling device control system 30 may comprise one or more coupling controllers for the coupling devices, also referred to as "couplers." Each coupling controller may be configured to tune the coupling strength of a corresponding coupling device from zero to a maximum value. It will be appreciated that the coupling devices may be tuned, for instance, to provide ferromagnetic or antiferromagnetic coupling between the qubits of the quantum processor 28. An example of such analog computer is disclosed in U.S. Pat. No. 8,421,053, and in U.S. Patent Application Publication No. 2015/0046681.

Figure 2:
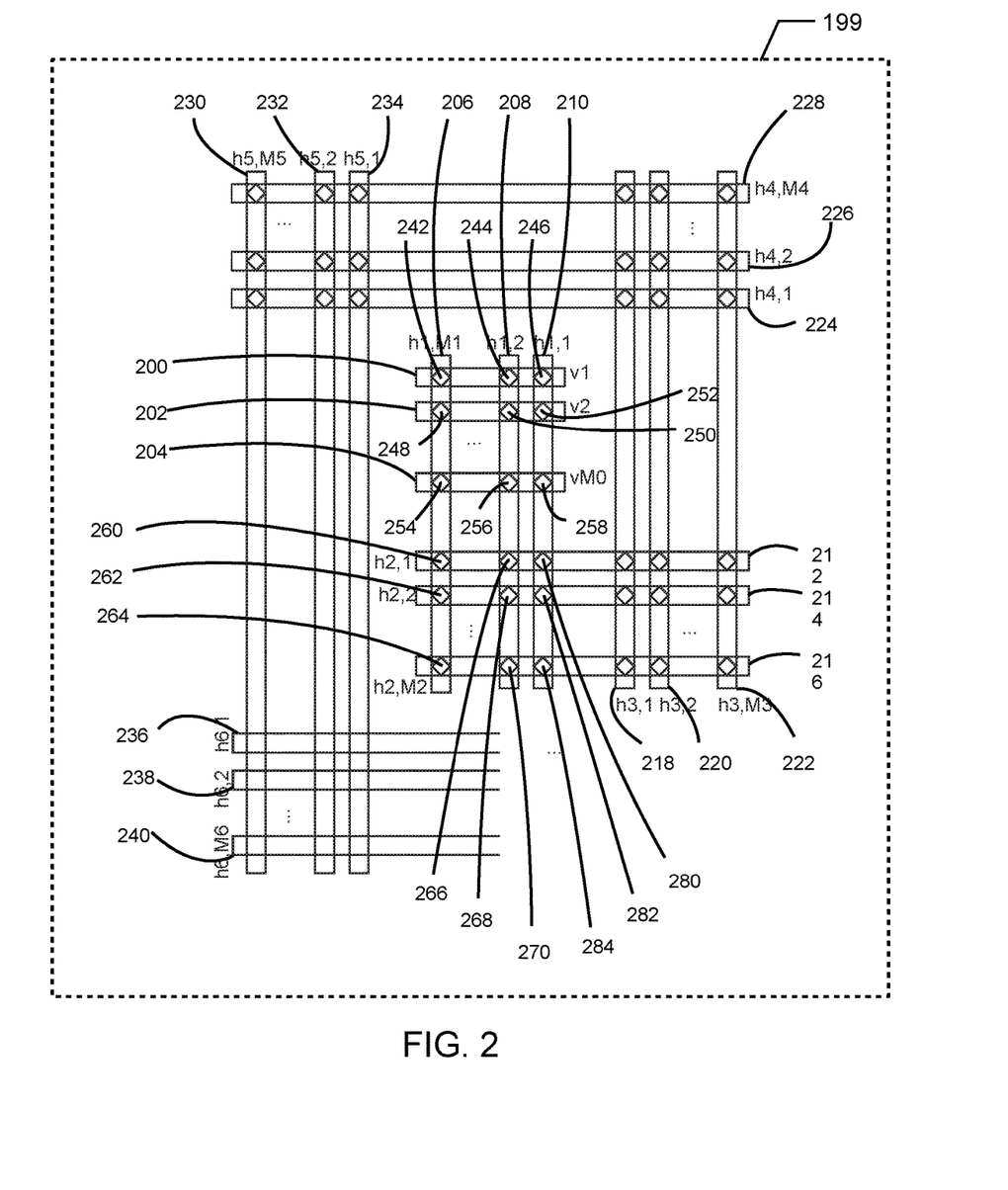
FIG. 2 is a diagram that shows a quantum processor architecture in accordance with an embodiment. In this embodiment, a non-overlapping layout is disclosed.

Now referring to FIG. 2, there is shown a first embodiment of a quantum processor 199. It will be appreciated that the quantum processor 199, shown in FIG. 2, discloses a non-overlapping layout, while the quantum processor 299, shown in FIG. 3, discloses an overlapping layout.

Still referring to FIG. 2, the quantum processor 199 comprises a first set of qubits and a second set of qubits.

The first set of qubits comprises a first plurality of substantially parallel qubits.

In the embodiment shown in FIG. 2, the first plurality of substantially parallel qubits comprises M0 qubits. More precisely, the first plurality of qubits comprises qubit $V_1$ 200, qubit $V_2$ 202, . . . , and qubit $V_{M0}$ 204.

The second set of qubits comprises N successive groups (1, 2, . . . , N) of a plurality of qubits. More precisely, the second set of qubits comprises N groups of a plurality of qubits wherein N is greater than or equal to two (2).

In the embodiment shown in FIG. 2, the second set of qubits comprises six groups of a plurality of qubits.

It will be appreciated that each group of a plurality of qubits comprises a plurality of substantially parallel qubits.

Moreover, it will be appreciated that each qubit of the first plurality of substantially parallel qubits of the first set of qubits crosses a portion of the plurality of substantially parallel qubits of a first group of the second set of qubits substantially perpendicularly.

In the embodiment shown in FIG. 2, a first group of a plurality of qubits comprises qubit $H_{1,1}$ 210, qubit $H_{1,2}$ 208, . . . , and qubit $H_{1,M1}$ 206. It will be therefore appreciated that the first group of qubits comprises M1 qubits.

A second group of qubits comprises qubit $H_{2,1}$ 212, qubit $H_{2,2}$ 214, . . . , and qubit $H_{2,M2}$ 216. It will be therefore appreciated that the second group of a plurality of qubits comprises M2 qubits.

A third group of qubits comprises qubit $H_{3,1}$ 218, qubit $H_{3,2}$ 220 . . . qubit $H_{3,M3}$ 222. It will be therefore appreciated that the third group of a plurality of qubits comprises M3 qubits.

The fourth group of a plurality of qubits comprises qubit $H_{4,1}$ 224, qubit $H_{4,2}$ 226, . . . , and qubit $H_{4,M4}$ 228. It will be therefore appreciated that the fourth group of a plurality of qubits comprises M4 qubits.

The fifth group of a plurality of qubits comprises qubit $H_{5,1}$ 234, qubit $H_{5,2}$ 232, . . . , and qubit $H_{5,M5}$ 230. It will be therefore appreciated that the fifth group of a plurality of qubits comprises M5 qubits.

Finally, the sixth group of a plurality of qubits comprises qubit $H_{6,1}$ 236, qubit $H_{6,2}$ 238, . . . , and qubit $H_{6,M6}$ 240. It will be therefore appreciated that the sixth group of a plurality of qubits comprises M6 qubits.

It will be further appreciated that each qubit of any given group of the second set of qubits crosses substantially perpendicularly a portion of the plurality of substantially parallel qubits of a successive group of the second set of qubits.

For instance, the second group of a plurality of qubits comprising qubit $H_{2,1}$ 212, qubit $H_{2,2}$ 214, . . . , and qubit $H_{2,M2}$ 216 crosses perpendicularly a portion of qubits of the first group of a plurality of qubits comprising qubit $H_{1,1}$ 210, qubit $H_{1,2}$ 208 and qubit $H_{1,M1}$ 206.

The second group of a plurality of qubits further crosses perpendicularly a portion of qubits of the third group of a plurality of qubits comprising qubit $H_{3,1}$ 218, qubit $H_{3,2}$ 220 and qubit $H_{3,M3}$ 222.

Similarly, the third group of a plurality of qubits, i.e., qubit $H_{3,1}$ 218, qubit $H_{3,2}$ 220, . . . , and qubit $H_{3,M3}$ 222 crosses substantially perpendicularly a portion of qubits of the second group of a plurality of qubits comprising qubit $H_{2,1}$ 212, qubit $H_{2,2}$ 214, . . . , and qubit $H_{2,M2}$ 216, as well as a portion of qubits of the plurality of qubits of the fourth group of qubits comprising qubit $H_{4,1}$ 224, qubit $H_{4,2}$ 226, . . . , and qubit $H_{4,M4}$ 228.

Each qubit of the fourth group of qubits, i.e., qubit $H_{4,1}$ 224, qubit $H_{4,2}$ 226, . . . , and qubit $H_{4,M4}$ 228 crosses substantially perpendicularly a portion of qubits of each group of two other neighboring groups, i.e., the fifth group of a plurality of qubits comprising qubit $H_{5,1}$ 234, qubit $H_{5,2}$ 232, . . . , and qubit $H_{5,M5}$ 230.

Each qubit of the fourth group of qubits also crosses substantially perpendicularly a portion of qubits of the third group of qubits comprising qubits $H_{3,1}$ 218, qubit $H_{3,2}$ 220, . . . , and qubit $H_{3,M3}$ 222.

Each qubit of the fifth group of qubits comprising $H_{5,1}$ 234, qubit $H_{5,2}$ 232, . . . , and qubit $H_{5,M5}$ 230 crosses substantially perpendicularly a portion of qubits of a corresponding set of qubits of each of the fourth group of qubits comprising qubit $H_{4,1}$ 224, qubit $H_{4,2}$ 226, . . . , and qubit $H_{4,M4}$ 228, as well as a portion of the sixth group of a plurality of qubits comprising $H_{6,1}$ 236, qubit $H_{6,2}$ 238, . . . , and qubit $H_{6,M6}$ 240.

It will be appreciated that the quantum processor 199 further comprises a plurality of couplers. Each coupler is used for providing a communicative coupling at a crossing of two qubits.

For instance, coupler 242 is provided at a crossing of qubit $V_1$ 200 and qubit $H_{1,M1}$ 206.

Coupler 244 is provided at a crossing of qubit $V_1$ 200 and qubit $H_{1,2}$ 208.

Coupler 246 is provided at a crossing of qubit $V_1$ 200 and qubit $H_{1,1}$ 210.

Coupler 252 is provided at a crossing of qubit $V_2$ 202 and qubit $H_{1,1}$ 210.

Coupler 250 is provided at a crossing of qubit $V_2$ 202 and qubit $H_{1,2}$ 208.

Coupler 248 is provided at a crossing of qubit $V_2$ 202 and qubit $H_{1,M1}$ 206.

Coupler 258 is provided at a crossing of qubit $H_{1,1}$ 210 and qubit $V_N$ 204.

Coupler 256 is provided at a crossing of qubit $V_N$ 204 and qubit $H_{1,2}$ 208.

Coupler 254 is provided at a crossing of qubit $V_N$ 204 and qubit $H_{1,M1}$ 206.

Coupler 260 is provided at a crossing of qubit $H_{2,1}$ 212 and qubit $H_{1,M1}$ 206.

Coupler 262 is provided at a crossing of qubit $H_{1,M1}$ 206 and qubit $H_{2,2}$ 214.

Coupler 264 is provided at a crossing of qubit $H_{1,M1}$ 206 and qubit $H_{2,M2}$ 216.

Coupler 266 is provided at a crossing of qubit $H_{1,2}$ 208 and qubit $H_{2,1}$ 212.

Coupler 268 is provided at a crossing of qubit $H_{2,2}$ 214 and qubit $H_{1,2}$ 208.

Coupler 270 is provided at a crossing of qubit $H_{1,2}$ 208 and qubit $H_{2,M2}$ 216.

Coupler 280 is provided at a crossing of qubit $H_{2,1}$ 212 and qubit $H_{1,1}$ 210.

Coupler 282 is provided at a crossing of qubit $H_{2,2}$ 214 and qubit $H_{1,1}$ 210.

Coupler 284 is provided at a crossing of qubit $H_{2,M2}$ 216 and qubit $H_{1,1}$ 210.

Figure 3:
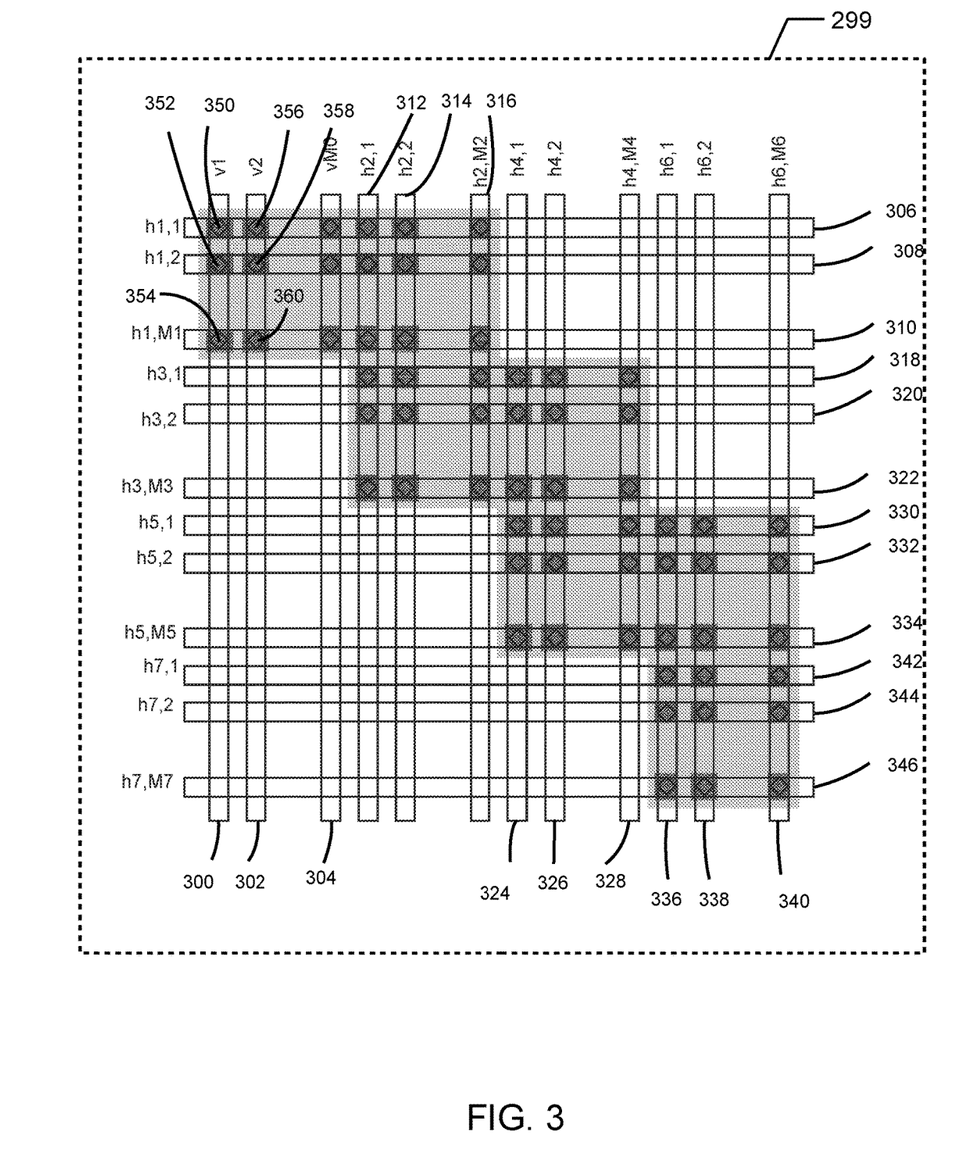
FIG. 3 is a diagram that shows another quantum processor architecture. In this embodiment, an overlapping layout is disclosed.

Now referring to FIG. 3, there is shown another embodiment of a quantum processor 299.

In this embodiment, the quantum processor 299 comprises a first set of qubits comprising a first plurality of substantially parallel qubits.

The quantum processor 299 further comprises a second set of qubits comprising N groups of a plurality of qubits, wherein N is greater than or equal to two (2).

The quantum processor 299 further comprises a plurality of couplers, each coupler for providing a communicative coupling at the crossing of two qubits.

More precisely, the first set of qubits comprises qubit $V_1$ 300, qubit $V_2$ 302, ..., and qubit $V_{M0}$ 304. It will be therefore appreciated that the first plurality of substantially parallel qubits comprises M0 qubits.

The second set of qubits comprises seven groups of a plurality of qubits. Each of the seven groups of qubits comprises a plurality of substantially parallel qubits.

Moreover, each qubit of the first plurality of substantially parallel qubits of the first set of qubits crosses a portion of the plurality of substantially parallel qubits of a first group of the second set of qubits substantially perpendicularly.

Each qubit of any given group of the second set of qubits crosses substantially perpendicularly a portion of the plurality of substantially parallel qubits of a successive group of the second set of qubits.

The first group of the second set of qubits comprises qubit $H_{1,1}$ 306, qubit $H_{1,2}$ 308, ..., and qubit $H_{1,M1}$ 310. It will be therefore appreciated that the first group of qubits comprises M1 qubits.

The second group of qubits comprises qubit $H_{2,1}$ 312, qubit $H_{2,2}$ 314, ..., and qubit $H_{2,M2}$ 316. It will be therefore appreciated that the second group of qubits comprises M2 qubits.

The third group of qubits comprises qubit $H_{3,1}$ 318, qubit $H_{3,2}$ 320, ..., and qubit $H_{3,M3}$ 322. It will be therefore appreciated that the third group of qubits comprises M3 qubits.

The fourth group of qubits comprises qubit $H_{4,1}$ 324, qubit $H_{4,2}$ 326, ..., and qubit $H_{4,M4}$ 328. It will be therefore appreciated that the fourth group of qubits comprises M4 qubits.

The fifth group of qubits comprises qubit $H_{5,1}$ 330, qubit $H_{5,2}$ 332, ..., and qubit $H_{5,M5}$ 334. It will be therefore appreciated that the fifth group of qubits comprises M5 qubits.

The sixth group of qubits comprises qubit $H_{6,1}$ 336, qubit $H_{6,2}$ 338, ..., and qubit $H_{6,M6}$ 340. It will be therefore appreciated that the sixth group of qubits comprises M6 qubits.

Finally, the seventh group of qubits comprises qubit $H_{7,1}$ 342, qubit $H_{7,2}$ 344, ..., and qubit $H_{7,M7}$ 346. It will be therefore appreciated that the seventh group of qubits comprises M7 qubits.

It will be appreciated that the couplers are provided for providing a communicative coupling at a crossing of two qubits.

It will be, however, appreciated that the couplers are provided such that there is a coupling between the qubits of the first set of qubits and the first group of qubits, a coupling between the first group of qubits and the second group of qubits, a coupling between the second group of qubits and the third of qubits, a coupling between the third group of qubits and the fourth group of qubits, a coupling between the fourth group of qubits and the fifth group of qubits, a coupling between the fifth group of qubits and the sixth group of qubits, as well as a coupling between the sixth group of qubits and the seventh group of qubits. It will be therefore appreciated that, for instance, the first group of qubits is coupled only to the first set of qubits, as well as to the qubits of the second group of qubits but not to any other qubit of the graph of qubits.

Setting up the Quantum Processor

It will be appreciated that in one embodiment each qubit of the first set of a plurality of qubits can be interpreted as a visible node of a Deep Boltzmann Machine while each other qubit of the quantum processor can be interpreted as a hidden node of a Deep Boltzmann Machine. In this sense, qubit labels and the node labels of the corresponding Deep Boltzmann Machine network are interchangeable.

Each "ON" coupling between a qubit in the first set of qubits and a qubit in the first group of the second set of qubits is considered as a quadratic weight between the corresponding visible node and the corresponding hidden node in the first layer. An "ON" coupling between any other two qubits is considered as a weight between the two corresponding hidden nodes in consecutive layers. It will be appreciated that, in the quantum processor disclosed herein, there are no intra-layer connections between qubits of a given group of a plurality of qubits as well as a no intra-layer connections between qubits in the first set of a plurality of qubits.

In one embodiment, each "ON" coupling has a float-valued strength which is an approximation of the corresponding weight. It will be appreciated that a non-zero weight between two nodes indicates "connectivity" of the nodes.

In one embodiment, each "OFF" coupling has an effectively zero valued strength and is an approximation of a disconnection between any two nodes in the Deep Boltzmann Machine.

In one embodiment, the weight connecting a qubit $v_i$ of the first set of qubits to a qubit $h_j$ of the first group of the second set of qubits is denoted by $w_{ij}$.

Still in this embodiment, the weight connecting a qubit $h_k$ of a given group of the second set of qubits to another qubit $h_j$ of another group of the second set of qubits is denoted by $u_{kj}$.

Biases are defined as weights on single nodes denoted as $a_i$ for a qubit $v_i$ of the first set of a plurality of qubits and $b_j$ for a qubit in a given group $h_j$ of the second set of qubits.

It will be appreciated that a clamped Deep Boltzmann Machine refers to a Deep Boltzmann Machine where the visible nodes are set to specific binary values v'.

In a clamped quantum processor the qubits of the first set of qubits are unused. It will be appreciated that a clamped quantum processor may be referred to as a quantum processor wherein the couplings between the qubits of the first set of qubits and the first group of the second set of qubits are turned "OFF." Instead, the value of the coupling between visible qubit $v_i$ from the first set of qubits and hidden node $h_j$ belonging in the first group of the second set of qubits is added to the bias $b_j$ multiplied by the value of visible node $v_i'$. Specifically, the bias of each qubit of the first group of the second set of qubits is adjusted by adding v'·$w_j$ where $w_j$ is the jth column in w=($w_{ij}$).

It will be appreciated that an unclamped quantum processor may be defined as a quantum processor that is not clamped.

Figure 4:
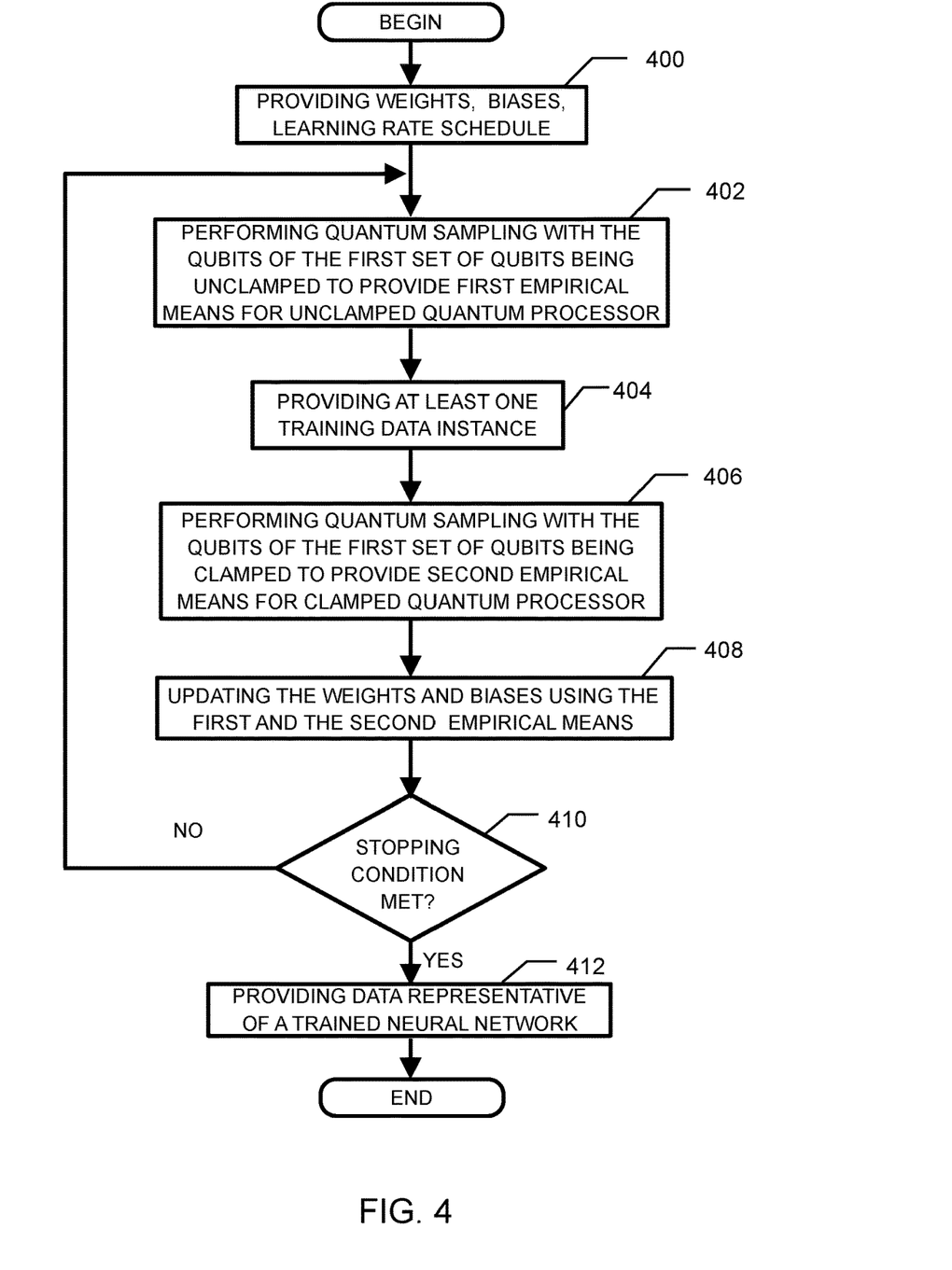
FIG. 4 is a flowchart that shows an embodiment of a method for training a neural network implemented in the quantum processor of the type shown in FIG. 2 and in FIG. 3.

Now referring to FIG. 4, there is shown an embodiment of a method for training a neural network implemented in the quantum processor disclosed for instance in FIGS. 2 and 3 wherein the neural network is a Deep Boltzmann Machine.

According to processing step 400, initialization data is provided.

In one embodiment, the initialization data comprises weights, biases and a learning rate schedule, and perhaps a system temperature.

The biases are provided for each qubit of the plurality of qubits, corresponding to the initial biases present in the corresponding Deep Boltzmann Machine. The biases comprise biases a and b.

The weights are provided for each coupler, between two qubits that are connected together, of the plurality of couplers of the quantum processor, corresponding to the initial weights present in the corresponding Deep Boltzmann Machine. The weights comprise initial weights w, u.

The learning rate ε is a float-valued number that multiplies the difference in empirical means between clamped and unclamped Deep Boltzmann Machines. It is used to scale the magnitude of changes of the weights and biases of the Deep Boltzmann Machine when introducing a training sample.

The learning rate schedule is a sequence of learning rates that vary from training sample to training sample. In one embodiment, the learning rate schedule is a sequence $(\varepsilon_i)_{i=1}^{K}$ of float numbers where i={1, . . . , K} is a count of training samples that have been applied to the Deep Boltzmann Machine. For example, the learning sequence could decrease the learning rate over sample count. For another example, the learning rate could maintain the same learning rate for all training samples.

It will be appreciated that the weights, the biases and the learning rate schedule may be performed according to various embodiments.

In one embodiment, the providing of the weights, the biases and the learning rate schedule is provided using the analog computer 10 and the digital computer 8.

More precisely, each weight is provided by the coupling device control system 30 of the analog computer 10.

In one embodiment, an indication of the weight to provide is provided to the coupling device control system 30 from the memory unit 22 of the digital computer 8.

Each bias is provided using the qubit control system 24 of the analog computer 10.

In one embodiment, an indication of the bias to provide is provided to the qubit control system 24 from the memory unit 22 of the digital computer 8.

According to processing step 402, a quantum sampling is performed with the qubits of the first set of qubits being unclamped.

It will be appreciated that the purpose of performing quantum sampling with the first set of qubits of the quantum processor being unclamped is to provide empirical means for the unclamped quantum processor.

When considering an unclamped quantum processor, quantum sampling is used to provide a sample from a distribution that approximates the Boltzmann distribution $$P(v, h) = \frac{1}{z}\exp\left(\frac{-1}{T}E(v, h)\right)$$

for the energy function $-E(v, h)=\Sigma_{ij}w_{ij}v_ih_j+\Sigma_i a_i v_i+\Sigma_{kl}u_{kl}h_k h_l+\Sigma_j b_j h_j$ of the unclamped quantum processor.

It will be appreciated that in the above, Z is the partition function (normalizing constant) and T is the effective temperature of the quantum processor.

It will be further appreciated that there is no need to specify or identify the effective temperature of the quantum processor T, as the physical temperature at which the quantum processor is working is inherently used.

It will be appreciated that the result from this processing step is empirical means, also referred to as first empirical means, for the unclamped network, comprising $\langle v_i h_j \rangle_{model}$, $\langle h_j h_k \rangle_{model}$, $\langle v_i \rangle_{model}$ and $\langle h_j \rangle_{model}$.

It will be appreciated that the empirical means $\langle v_i h_j \rangle_{model}$ is referred to as the model based empirical means of the product of visible and hidden nodes i, j respectively. It is calculated based on the plurality of samples provided by quantum sampling performed on an unclamped quantum processor.

It will be appreciated that the empirical means $\langle h_j h_k \rangle_{model}$ is referred to as the model based empirical means of the product of hidden and hidden nodes j, k respectively. It is calculated based on the plurality of samples provided by quantum sampling performed on an unclamped quantum processor.

It will be appreciated that the empirical means $\langle v_i \rangle_{model}$ is referred to as the model based empirical means of the visible node i. It is calculated based on the plurality of samples provided by quantum sampling performed on an unclamped quantum processor.

It will be appreciated that the empirical means $\langle h_j \rangle_{model}$ is referred to as the model based empirical means of the hidden node j. It is calculated based on the plurality of samples provided by quantum sampling performed on an unclamped quantum processor.

According to processing step 404, at least one training data instance is provided.

It will be appreciated that the at least one training data instance provided is used for training the Deep Boltzmann Machine.

It will be appreciated that the at least one training data instance is a vector of binary values representing a realization of multivariate binary random variables whose distribution is being approximated by the Deep Boltzmann Machine by way of training. In one embodiment, the size of the training data is denoted by K.

It will be appreciated that the at least one training data instance may be provided according to various embodiments.

In one embodiment, the at least one training data instance is obtained from a previously generated data set. For instance, the previously generated data set may be stored in the memory unit 22 of the digital computer 8. The previously generated data set may then be provided to the qubit control system 24 of the analog computer 10 via the communication ports 20 of the digital computer 8.

In one alternative embodiment, the at least one training data instance is obtained from a real-time source.

The real-time source may originate from the digital computer 8 in one embodiment.

In an alternative embodiment, the real-time source may originate from another processing unit operatively coupled to the analog computer 10.

According to processing step 406, quantum sampling is performed with the qubits of the first set of qubits being clamped.

More precisely, it will be appreciated that the biases of the first group of the second set of qubits are altered using the biases on a first group of neurons associated with the first group of qubits, the weights of the switched off couplings, and the at least one training data instance, to determine second empirical means.

In fact, it will be appreciated that at least one training data instance is provided to the visible nodes of the Deep Boltzmann Machine in sequential order. This is done by clamping the visible nodes of the Deep Boltzmann Machine to one instance of training data v'.

In one embodiment, this is done by turning "OFF" couplers between the first set of pluralities of qubits and the first group of the second set of pluralities of qubits as provided by the coupling device control system 30 of the analog computer 10, and by setting the biases of the first group of the second set of pluralities of qubits as described above, in description of a clamped quantum processor, as provided by qubit control system 24 of the analog computer 10.

The corresponding Boltzmann distribution is sampled using quantum sampling with the quantum processor clamped to the training data v' as described above. Given v', the energy function of the network is given by E(h)=E(h, v'), hence only a function of h.

The corresponding Boltzmann distribution is an approximation to $$P(h \mid v') = \frac{1}{z_h} \exp\left(\frac{-1}{T} E(h)\right).$$

This processing step provides empirical means, also referred to as second empirical means, for the clamped network which consist of $\langle h_j, h_k \rangle_{data}$ and $\langle h_j \rangle_{data}$.

It will be appreciated that the empirical means $\langle h_j h_k \rangle_{data}$ is referred to as the data-based empirical means of the product of hidden and hidden nodes j, k respectively. It is calculated based on the plurality of samples provided by quantum sampling performed on a clamped quantum processor.

It will be appreciated that the empirical means $\langle h_j \rangle_{data}$ is referred to as the data-based empirical means of the hidden node j. It is calculated based on the plurality of samples provided by quantum sampling performed on a clamped quantum processor.

According to processing step 408, the weights and the biases of the quantum processor are updated.

It will be appreciated that the weights and the biases of the quantum processor are updated using the clamped and unclamped empirical means, i.e., using the first and the second empirical means.

More precisely, given the model and the data empirical means, the weights and the biases of the quantum processor can be updated using:

$$\Delta w_{ij} = \varepsilon(\langle v_i h_j \rangle_{data} - \langle v_i h_j \rangle_{model}), \Delta u_{kl} = \varepsilon(\langle h_k h_l \rangle_{data} - \langle h_k h_l \rangle_{model}).$$

$$\Delta a_i = \varepsilon(\langle v_i \rangle - \langle v_i \rangle_{model}), \Delta b_j = \varepsilon(\langle h_j \rangle_{data} - \langle h_j \rangle_{model})$$

where ε is a learning rate provided from a learning rate schedule.

According to processing step 410, a test is performed in order to find out if a stopping condition is met.

In fact, it will be appreciated that the training of the Deep Boltzmann Machine may be stopped if there is no training data left instance in the provided training data set, or if it is decided that no further training data instance will be provided.

In an online learning scenario, the training of the Deep Boltzmann Machine may be stopped if it is determined that no further training data instance will be provided.

In online training, the Deep Boltzmann Machine that has been trained with all previous training data is available to be used for the intended task between any two consecutive training samples.

In an offline learning scenario, the training may be stopped if there is no training data instance left in the provided training dataset or if it is decided, for any reason, that no further training data instance will be provided. In offline training, the Deep Boltzmann Machine is not available to be used for the intended task in between any two consecutive training samples.

According to processing step 412, a trained Deep Boltzmann Machine data is provided.

It will be appreciated that the trained Deep Boltzmann Machine data comprises final weights and biases of the Deep Boltzmann Machine.

It will be appreciated that the trained Deep Boltzmann Machine data may be provided according to various embodiments.

In one embodiment, the trained Deep Boltzmann Machine data is stored in the memory unit of the digital computer 22.

In an alternative embodiment, the trained Deep Boltzmann Machine data is provided to another processing unit, not shown, operatively connected to the digital computer 8.

The Deep Boltzmann Machine is trained in order to sample from the approximate distribution over the Deep Boltzmann Machine nodes. Depending on the application, this can be done by clamping all, some, or none of the visible nodes, and sampling from the approximate distribution of all or some of the remaining Deep Boltzmann Machine nodes.

It will be appreciated that the trained Deep Boltzmann Machine data may be of great use for various applications.

For instance, the trained Deep Boltzmann Machine data when implemented in a corresponding quantum processor may be used for applications selected from a group non limited to visual object recognition, speech recognition, classification task, regression task, dimensionality reduction, information retrieval, modeling image patches, extracting optical flow and robotics.

Figure 5:
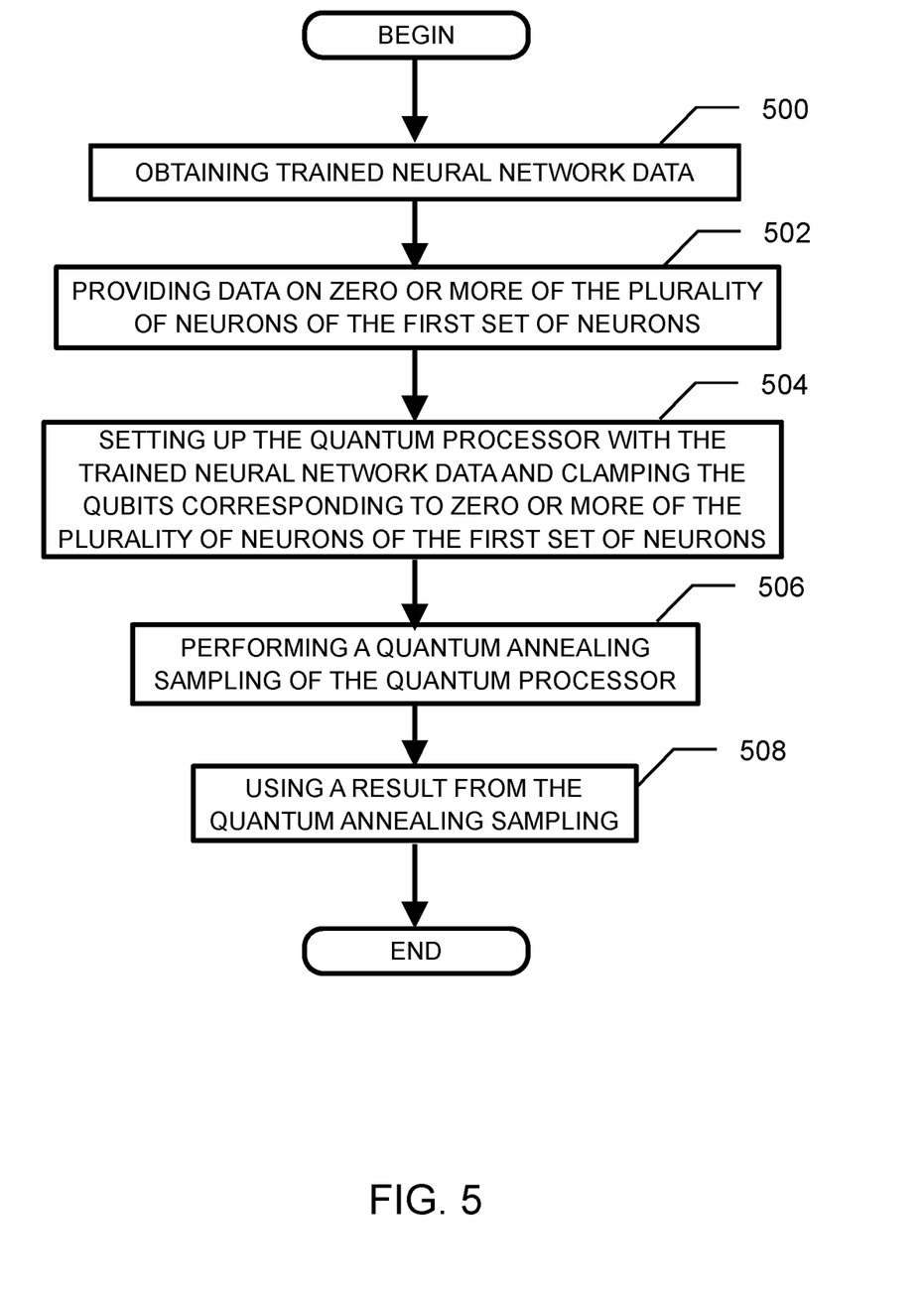
FIG. 5 is a flowchart that shows an embodiment of a method for using a quantum processor in an application, with data obtained from a corresponding trained neural network.

Now referring to FIG. 5, there is shown an embodiment for using a quantum processor with the trained Deep Boltzmann Machine data in an application.

According to processing step 500, the trained Deep Boltzmann Machine data is obtained.

It will be appreciated that the trained quantum processor data may be obtained according to various embodiments.

In one embodiment, the trained Deep Boltzmann Machine data is obtained from a digital computer operatively connected to an analog computer comprising the quantum processor.

In an alternative embodiment, the trained Deep Boltzmann Machine data is obtained from the memory unit of a digital computer.

According to processing step 502, the quantum processor is set up with the trained Deep Boltzmann Machine data.

It will be appreciated that the quantum processor may be set up with the trained Deep Boltzmann Machine data according to various embodiments. For instance, in the case where the analog computer comprises a coupling device control system and a qubit control system, the quantum processor may be set up with the trained Deep Boltzmann Machine data using the coupling device control system and the qubit control system of the analog computer.

According to processing step 504, input data is provided on zero or more of the plurality of qubits of the first set of qubits by clamping zero or more of the first set of qubits.

It will be appreciated that the Deep Boltzmann Machine data is comprised of the weights and biases of the trained Deep Boltzmann Machine, while the input data is a binary vector applied to the first set of qubits in the quantum processor representing the visible nodes of the Deep Boltzmann Machine.

According to processing step 506, a quantum sampling of the Boltzmann distribution is performed. The purpose of the quantum sampling of the Boltzmann distribution is to obtain a sample of such a distribution.

According to processing step 508, a distribution sample result from the quantum sampling is used for the application. In one scenario, the distribution sample could be used to reconstruct an image. In another scenario, the distribution could be used to classify input data. In another scenario, the distribution could be used to identify appropriate actions in decision processes.

It will be appreciated that the memory unit 22 of the digital computer 8 may comprise an application-specific program for training the Deep Boltzmann Machine implemented in the quantum processor 28.

The application-specific program for training the Deep Boltzmann Machine implemented in the quantum processor 28 may comprise instructions for providing initialization data for initializing the plurality of couplers and the plurality of qubits of the quantum processor 28.

The application-specific program for training the Deep Boltzmann Machine implemented in the quantum processor 28 may further comprise instructions for, until a criterion is met, performing a quantum sampling of the quantum processor to provide first empirical means; obtaining at least one training data instance for training the neural network; performing a quantum sampling of the quantum processor; wherein no bias is assigned to the qubits of the first set of qubits of the quantum processor; wherein the couplings of the first set of qubits and the first group of the second set of qubits are switched off; further wherein the biases of the first group of the second set of qubits are altered using the biases on a first group of neurons associated with the first group of qubits, the weights of the switched off couplings, and the at least one training data instance, to determine second empirical means and updating corresponding weights and biases of the couplers and the qubits of the quantum processor using the first and the second empirical means.

The application-specific program for training the Deep Boltzmann Machine implemented in the quantum processor 28 may further comprise instructions for providing final weights and biases of the couplers and the qubits of the quantum processor as data representative of a trained neural network.

It will be appreciated that a non-transitory computer-readable storage medium is further disclosed for storing computer-executable instructions which, when executed, cause a digital computer to perform a method for training a Deep Boltzmann Machine implemented in a quantum processor as disclosed above, the method comprising providing initialization data for initializing the plurality of couplers and the plurality of biases of the qubits of the quantum processor; until a criterion is met: performing a quantum sampling of the quantum processor to provide first empirical means, obtaining at least one training data instance for training the neural network, performing a quantum sampling of the quantum processor, wherein no bias is assigned to the qubits of the first set of qubits of the quantum processor; wherein the couplings of the first set of qubits and the first group of the second set of qubits are switched off, further wherein the biases of the first group of the second set of qubits are altered using the biases on a first group of neurons associated with the first group of qubits, the weights of the switched off couplings, and the at least one training data instance, to determine second empirical means, and updating corresponding weights and biases of the couplers and the qubits of the quantum processor using the first and second empirical means; and providing final weights and biases of the couplers and the qubits of the Deep Boltzmann Machine corresponding to the quantum processor after the criterion is met.

It will be appreciated that an advantage of the quantum processor disclosed herein is that it is comprised only of a system of quantum circuits with degree two interactions. It will be further appreciated that such quantum processor may be manufactured using the methods disclosed in U.S. Pat. No. 8,421,053 in one embodiment.

It will be appreciated that another advantage of the method disclosed herein for training the Deep Boltzmann Machine implemented in the quantum processor is that it is faster than prior-art methods.

It will be further appreciated that another advantage of the method disclosed herein for training the Deep Boltzmann Machine implemented in the quantum processor is that it is more accurate compared to the Restricted Boltzmann Machine by Restricted Boltzmann Machine training method.

Although the above description relates to specific embodiments as presently contemplated by the inventors, it will be understood that the invention in its broad aspect includes functional equivalents of the elements described herein.

The invention claimed is:

1. A quantum processor comprising:
   a first group of substantially parallel superconducting quantum circuits;
   a second group of substantially parallel superconducting quantum circuits, wherein the second group is substantially perpendicular to the first group; and a third group of substantially parallel superconducting quantum circuits, wherein the third group is substantially perpendicular to the second group;

wherein the quantum processor has a non-overlapping layout, such that:

each superconducting quantum circuits of tire first group is sized and shaped so that it crosses only the second group, each superconducting quantum circuit of the second group is sized and shaped so that it crosses only the first group and the third group, and each superconducting quantum circuits of the third group is sized and shaped so that it crosses only the second group and a successive group of parallel superconducting quantum circuits which is perpendicular to the third group.

2. The quantum processor as claimed in claim 1, wherein the quantum processor is used for implementing a neural network comprising a plurality of neurons and a plurality of synapses; wherein each neuron of the plurality of neurons is associated to a qubit and each synapse of the plurality of synapses is associated to a coupler of the quantum processor.

3. A method for training the neural network implemented in the quantum processor claimed in claim 2, the method comprising:

providing initialization data for initializing the plurality of couplers and the superconducting quantum circuits of the quantum processor;

until a criterion is met:

performing a quantum sampling of the quantum processor to provide first empirical means;

obtaining at least one training data instance for training the neural network;

performing a quantum sampling of the quantum processor; wherein no bias is assigned to the superconducting quantum circuits of the first group: wherein couplings of the first group and the second group are switched off; further wherein the biases of the second group are altered using the biases on a first group of neurons associated with the first group of superconducting quantum circuits, the weights of the switched off couplings, and the at least one training data instance, to determine second empirical means;

updating corresponding weights and biases of the couplers and the superconducting quantum circuits of the quantum processor using the first and second empirical means;

and providing final weights and biases of the couplers and the superconducting quantum circuits of the quantum processor indicative of data representative a trained neural network.

4. The method as claimed in claim 3, wherein the initialization data comprise a plurality of biases, each for a superconducting quantum circuits of the quantum processor;

a plurality of weights, each weight for a coupler of the plurality of couplers and a learning rate schedule.

5. The method as claimed in claim 4, wherein the providing of the initialization data is performed using an analog computer comprising the quantum processor and a digital computer operatively connected to the analog computer.

6. The method as claimed in claim 5, wherein the digital computer comprises a memory;

further wherein the providing of the final weights and biases of the couplers and the qubits of the quantum processor comprises storing the final weights and biases of the couplers and the superconducting quantum circuits of the quantum processor in the memory of the digital computer.

7. The method as claimed in claim 5, wherein the providing of the final weights and biases of the couplers and the superconducting quantum circuits of the quantum processor comprises providing the final weights and biases of the couplers and the qubits of the quantum processor to another processing unit operatively connected to the digital computer.

8. The method as claimed in claim 3, wherein the at least one training data instance is obtained from a previously generated data set.

9. The method as claimed in claim 8, wherein the generated data set is stored in a digital computer operatively connected to an analog computer comprising the quantum processor.

10. The method as claimed in claim 3, wherein the at least one training data instance is obtained from a real-time source.

11. The method as claimed in claim 10, wherein the real-time source originates from a digital computer operatively connected to an analog computer comprising the quantum processor.

12. The method as claimed in claim 3, wherein the criterion comprises a stopping condition; wherein the stopping condition comprises determining if there is no further training data instance available.

13. The method as claimed in claim 2, wherein the neural network is a Deep Boltzmann Machine.

14. A digital computer comprising:

a central processing unit;

a display device;

a communication port for operatively connecting the digital computer to an analog computer comprising a quantum processor used for implementing a neural network as claimed in claim 2;

a memory unit comprising an application for training the neural network, the application comprising:

instructions for providing initialization data for initializing die plurality of couplers and the plurality of biases of the superconducting quantum circuits of the quantum processor;

instructions for, until a criterion is met:

performing a quantum, sampling of the quantum processor to provide first empirical means;

obtaining at least one training data instance for training the neural network;

performing a quantum sampling of the quantum processor; wherein no bias is assigned to the superconducting quantum circuits of the first group; wherein the couplings of the first group and the second group are switched off; farther wherein the biases of the second group of superconducting quantum circuits are altered using the biases on a first group of neurons associated with the first group of superconducting quantum circuits, the weights of the switched off couplings, and the at least one training data instance, to determine second empirical means; and updating corresponding weights and biases of the couplers and the superconducting quantum circuits of the quantum processor using the first and the second empirical means; and instructions for providing final weights and biases of the couplers and the superconductive quantum circuits of the quantum processor as data representative of a trained neural network.

15. A non-transitory computer readable storage medium for storing computer-executable instructions which, when executed, cause a digital computer to perform a method for training the neural network implemented in the quantum processor claimed in claim 2, the method comprising:
providing initialization data for initializing the plurality of couplers and the superconducting quantum circuits of the quantum processor;
until a criterion is met:
performing a quantum sampling of the quantum processor to provide first empirical means;
obtaining at least one training data instance for training the neural network;
performing a quantum sampling of the quantum processor; wherein no bias is assigned to the superconducting quantum circuits of the first group; wherein the couplings of the first group and the second group are switched off; further wherein the biases of the second group of superconducting quantum circuits are altered using the biases on a first group of neurons associated with the first group of superconducting quantum circuits, the weights of the switched off couplings, and the at least one training data instance, to determine second empirical means; and
updating corresponding weights and biases of the couplers and the superconducting quantum circuits of tire quantum processor using the first and second empirical means; and
providing final weights and biases of the couplers and the qubits of the quantum processor indicative of data representative a trained neural network.

* * * * *